United States Patent
Ibuk

(10) Patent No.: US 11,680,018 B2
(45) Date of Patent: Jun. 20, 2023

(54) SEALING WALL BUILDING MATERIAL AND METHOD FOR PRODUCING A SEALING WALL BUILDING MATERIAL

(71) Applicant: BAUER Spezialtiefbau GmbH, Schrobenhausen (DE)

(72) Inventor: Hursit Ibuk, Augsburg (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 0 days.

(21) Appl. No.: 16/607,617

(22) PCT Filed: Apr. 20, 2018

(86) PCT No.: PCT/EP2018/060165
§ 371 (c)(1),
(2) Date: Oct. 23, 2019

(87) PCT Pub. No.: WO2018/197354
PCT Pub. Date: Nov. 1, 2018

(65) Prior Publication Data
US 2020/0095165 A1    Mar. 26, 2020

(30) Foreign Application Priority Data

Apr. 26, 2017    (EP) .................................... 17168267

(51) Int. Cl.
| | | |
|---|---|---|
| *C04B 28/02* | (2006.01) | |
| *B09B 1/00* | (2006.01) | |
| *E02D 5/18* | (2006.01) | |
| *C04B 111/00* | (2006.01) | |
| *B09B 101/30* | (2022.01) | |

(52) U.S. Cl.
CPC ............ *C04B 28/021* (2013.01); *B09B 1/004* (2013.01); *B09B 1/008* (2013.01); *E02D 5/18* (2013.01); *B09B 2101/30* (2022.01); *C04B 2111/00293* (2013.01); *C04B 2111/00775* (2013.01)

(58) Field of Classification Search
None
See application file for complete search history.

(56) References Cited

U.S. PATENT DOCUMENTS

| | | | | | |
|---|---|---|---|---|---|
| 4,210,457 | A | * | 7/1980 | Dodson ................... | C04B 28/04 106/459 |
| 4,256,500 | A | * | 3/1981 | Turpin, Jr. .............. | C04B 24/06 106/679 |
| 4,336,069 | A | * | 6/1982 | Dodson ................. | C04B 18/021 588/257 |
| 4,419,135 | A | * | 12/1983 | Hoge ...................... | C04B 28/02 106/678 |
| 4,731,120 | A | * | 3/1988 | Tuutti ....................... | B09B 1/00 106/697 |
| 4,741,782 | A | * | 5/1988 | Styron ................... | C04B 18/027 106/122 |
| 5,358,676 | A | * | 10/1994 | Jennings ................... | B28B 1/00 264/102 |
| 5,536,310 | A | * | 7/1996 | Brook ...................... | C04B 28/02 106/692 |
| 5,637,412 | A | * | 6/1997 | Jennings ................... | B28B 1/00 106/606 |
| 5,772,751 | A | * | 6/1998 | Nisnevich ............. | C04B 18/027 106/672 |
| 6,251,179 | B1 | * | 6/2001 | Allan ...................... | C04B 28/02 106/718 |
| 6,773,500 | B1 | * | 8/2004 | Creamer ................... | B28B 1/50 106/672 |
| 7,478,675 | B2 | * | 1/2009 | Roddy ..................... | C04B 28/02 106/705 |
| 7,993,570 | B2 | * | 8/2011 | Naji ....................... | C04B 41/009 264/642 |
| 2007/0029699 | A1 | * | 2/2007 | Lucini ..................... | C04B 28/26 264/239 |
| 2008/0178770 | A1 | * | 7/2008 | Schumacher ........... | C04B 28/18 106/708 |
| 2012/0298012 | A1 | * | 11/2012 | Berke ..................... | C08L 33/00 106/801 |
| 2013/0029050 | A1 | * | 1/2013 | Hills ....................... | C04B 28/26 427/337 |
| 2013/0119576 | A1 | * | 5/2013 | Ciuperca ................. | C04B 7/26 264/232 |
| 2014/0216304 | A1 | * | 8/2014 | Hou ........................ | C04B 24/38 106/708 |
| 2014/0283711 | A1 | * | 9/2014 | Guerra Barrena ...... | C04B 18/02 106/708 |
| 2015/0344366 | A1 | * | 12/2015 | Iruya ...................... | C04B 16/04 524/4 |
| 2015/0368155 | A1 | * | 12/2015 | Masloff ................... | C04B 28/02 106/674 |
| 2017/0121961 | A1 | * | 5/2017 | Hodson ................. | E04C 2/2885 |
| 2017/0275201 | A1 | * | 9/2017 | Liguori .................. | C04B 28/02 |
| 2018/0050963 | A1 | * | 2/2018 | Hesse ..................... | C04B 14/06 |
| 2018/0065888 | A1 | * | 3/2018 | Donovan ............... | C04B 28/08 |
| 2018/0244573 | A1 | * | 8/2018 | Thomas ................. | C04B 28/04 |
| 2019/0077712 | A1 | * | 3/2019 | Barbato .................... | C04B 7/02 |

OTHER PUBLICATIONS

International Preliminary Report On Patentability issued in PCT/EP2018/060165; completed on Jun. 28, 2019.
Chunliang Zhang et al. "Properties of fly ash-flotation tailings-cement mixtures for packing and stowing in mining", Glückauf-Forschungshefte, Verlag Gluckauf, Essen, vol. 52, No. 6, Dec. 1991.

* cited by examiner

Primary Examiner — Joshua K Ihezie
(74) Attorney, Agent, or Firm — Studebaker & Brackett PC

(57) ABSTRACT

The invention relates to a sealing wall building material, which has a binding agent with cement and aggregates. It is provided according to the invention that the binding agent comprises a mixture of cement and fly ash, wherein it is free of clay material, and that it has an impermeability with a kf value of $10^{-7}$ m/s and less.

7 Claims, No Drawings

SEALING WALL BUILDING MATERIAL AND METHOD FOR PRODUCING A SEALING WALL BUILDING MATERIAL

The invention relates to a sealing wall building material, which has a binding agent with cement and aggregates, according to the preamble of claim 1.

The invention further relates to a method for producing a sealing wall building material according to claim 9.

A sealant is known from EP 0 483 884 A2 for sealing the bottoms and walls of refuse and waste landfill sites with increasingly aggressive seepage liquid or as a lining of collecting troughs or containers for highly aggressive liquids. The use of a mixture combination of a powdered clay component of approximately 15% by weight, a mineral or rock flour content of around 85% and a content of pore-sealing hydrogel is known for this.

A generic sealing wall building material is disclosed by AT 393 381 B. The binder mixture described herein, which is provided for sealing walls, for example, consists of cement and other additives. To achieve the required impermeability, at least one clay mineral capable of swelling is provided.

Sealing wall materials of this kind are used in particular to produce so-called diaphragm or sealing walls, which are used for sealing off groundwater from landfill or other contaminated sites, for example. Compared with conventional concrete masses, a high impermeability or a correspondingly low permeability coefficient is desired, in order to ensure a suitable barrier effect. At the same time, a reduced strength and a certain plasticity of the sealing wall building material is desired, so that in the event of settlement a high sealing effect and a certain adaptability of the mass continues to be ensured.

To this end it is known to add a swellable or preswollen clay mineral, for instance montmorillonite or bentonite, to the building material. Such additions of clay minerals ensure a high impermeability in the curing concrete mass, wherein such masses are also termed clay concretes, which are defined in DIN EN 1538: 2015-10, Section 6.4.

Clay minerals require special processing on account of their swelling property with water. It is usually necessary to prepare the binder mixture with the cement and the aggregates separately and then to finish process the preswollen clay mineral in a concluding method step with a separate mixer to the sealing wall mass.

There is disclosed by WO 94/22783 A1 a deformable landfill compound, which is composed of various components, wherein a swellable clay mineral is likewise provided with a weight proportion of 2% to 15%.

A method is known from DE 199 12 652 A1 for the manufacture of an acid-resistant concrete. In this case a mixture of 60 to 80% by weight of cement, 15 to 25% by weight of fly ash and 5 to 15% by weight of micro-silica is used as a binder.

DE 44 07 329 A1 describes a method for the manufacture of a multicomponent material mix, which comprises 284 kg of brown coal filter ash, 32 kg of hard coal filter ash, 15 kg of Portland cement, 650 kg of gravel sand and 80 kg of steel fibers.

The technical article by Chunliang Zhang et al. "Properties of fly ash-flotation tailings-cement mixtures for packing and stowing in mining", Glückauf-Forschungshefte, Verlag Glückauf, Essen, Vol. 52, No. 6, December 1991, deals with the influence of the cement content and flotation tailings content on the permeability coefficient kf, relating to the impermeability, of the microstructure produced. The flotation tailings used in this case contain a swellable clay mineral.

DIN 18130-1 specifies the determination of the coefficient of permeability kf.

The object of the invention is to specify a sealing wall building material and a method for its production, wherein the sealing wall building material can be produced especially easily and efficiently with a good sealing property.

The object is achieved according to the invention by a sealing wall building material with the features of claim 1 on the one hand and by a method with the features of claim 9 on the other. Preferred embodiments are indicated in the dependent claims.

The sealing wall building material according to the invention is characterized in that the binding agent comprises a mixture of cement and fly ash, wherein it is free of clay mineral, and has an impermeability with a kf value of $10^{-7}$ m/s and less.

One aspect of the invention consists in omitting a swellable or preswollen clay mineral, which can only be processed with difficulty, in the production of the binding agent and in providing a mixture of cement and fly ash for the binding agent. The binding agent and the mass are adjusted here as a whole such that an impermeability with a kf value of $10^{-7}$ m/s and less is provided.

The invention is based on the realization that for a sealing wall mass with a good sealing property, the use of clay mineral is not imperative, but this can be replaced by fly ash according to the invention. Fly ash is the solid, dispersible (particulate or powdered) residue of combustion, which due to its high dispersity is discharged with the flue gases. The particle size ranges in this case from roughly 1 μm to 1 mm. Fly ash occurs in large quantities in combustion power plants or in waste incinerators, wherein the fly ash is separated from the flue gases by suitable filter installations. Fly ash is thus suitable with its dispersity for increasing the sealing effect and is also available in sufficient quantities at low cost.

A preferred embodiment of the invention consists in the aggregate comprising sand and/or coarse aggregate. Sand 0/2 with a weight proportion of 400 to 1000 kg/m$^3$ and aggregate 2/8 of 400 to 800 kg/m$^3$ can be provided here. Other aggregate mixtures can also be provided depending on the recipe.

Furthermore, it has turned out to be particularly advantageous that a content of binding agent of at least 400 kg/m$^3$ concrete is provided. In this case the binding agent can have a content of cement of preferably at least 75 kg/m$^3$ and fly ash of at least 250 kg/m$^3$. It is particularly preferable if per cubic meter of concrete, binding agent is provided that provides a content of cement of 100 kg/m$^3$ and of fly ash in a quantity of 300 to 350 kg/m$^3$ sealing wall mass.

A particularly good ratio of impermeability to strength is achieved according to a further development of the invention in that the binding agent has a ratio of cement to fly ash of between 2% and 60%. Thus, for example, there are two parts cement to 98 parts fly ash or 40 parts cement to 60 parts fly ash. The rest of the recipe can consist of aggregate, additives and water. Here the water content is significantly higher than in structural concretes. A ratio of cement to fly ash of at least 7%, in particular of at least 10%, is preferably provided.

Another improvement in the sealing wall building material according to the invention can be achieved in that at least one additive, in particular a flow agent and/or a retarder, is provided. The flow capability of the raw sealing wall mass can be influenced and set in a desired manner using a flow agent. The setting behavior of the sealing wall mass can be influenced and set using a so-called retarder. In particular, a setting time can be extended in this way, so that sufficient time remains for transporting and processing the sealing wall building material.

It has also proved particularly advantageous if the fresh mass has a bulk density of between 2.0 g/cm³ and 2.4 g/cm³. Fresh mass is to be understood here as the finished sealing wall building material in its still fluid, uncured state. With respect to flow capability, it is preferred that a flow spread a is between 57 cm and 63 cm, wherein the flow spread is to be measured in accordance with DIN EN 206: 2014-07.

In a further development of the sealing wall building material according to the invention, it is further preferred that a monoaxial compressive strength $q_u$ of $q_u \leq 500$ kN/m² is provided at an age of 7 days and of $1000$ kN/m² $\leq q_u \leq 5000$ kN/m² at an age of 28 days. In this value range the sealing wall building material is sufficiently stable, but at the same time still possesses a certain adaptability, for instance to changes of shape and settlement, so that a sealing wall manufactured from this is sufficiently stable.

Furthermore, the invention relates to a sealing wall or a sealing wall element, which is manufactured using a sealing wall building material that was described previously. Such a sealing wall or such a sealing wall element, which can also be a base slab, for example, can be manufactured simply and economically, wherein good impermeability and strength are provided at the same time.

The invention further relates to a method for producing a sealing wall building material, in which a binding agent is mixed with cement and aggregate in a single mixer with the addition of water to form the sealing wall building material, wherein the binding agent comprises a mixture of cement and fly ash and the sealing wall building material is free of a clay material, and wherein an impermeability with a kf value of $10^{-7}$ m/s and less is set.

The sealing wall building material described previously can be manufactured in a simple and efficient manner using the method according to the invention.

The impermeability of a sealing wall building material according to the invention preferably lies in the range of a kf value of $10^{-10}$ m/s and less.

The invention claimed is:

1. A sealing wall element formed of a sealing wall building material which has a binding agent with cement and aggregates,
   the sealing wall element comprising sand with an aggregate 0/2 with a weight proportion of 400 to 1,000 kg/m³ and a coarse grit with an aggregate 2/8 with a weight proportion of 400 to 800 kg/m³ and wherein a content of binding agent of at least 400 kg/m³ is provided,
   wherein
   the binding agent comprises a mixture of cement and fly ash, wherein the binding agent is free of clay material,
   the sealing wall building material has an impermeability measured according to DIN 18130-01 with a kf value of $10^{-7}$ m/s or less when the sealing wall building material is cured, and
   the binding agent has a ratio of cement to fly ash of between 7% and 60%.

2. A sealing wall element according to claim 1, further comprising:
   a binding agent having a content of cement of 100 kg/m³ and a content of fly ash of 300 to 350 kg/m³.

3. A sealing wall element according to claim 1, further comprising:
   a flow agent and/or a retarder.

4. A sealing wall element according to claim 1, wherein a fresh mass of the sealing wall building material has a bulk density of between 2.0 g/cm³ and 2.4 g/cm³.

5. A sealing wall element according to claim 1, wherein
   a monoaxial compressive strength $q_u$ of $q_u \geq 500$ kN/m² is provided at an age of 7 days and of $1000$ kN $\leq q_u \leq 5000$ kN/m² at an age of 28 days.

6. A sealing wall with a sealing wall element according to claim 1.

7. A method for manufacturing a sealing wall element according to claim 1,
   wherein binding agent with cement and aggregates with the addition of water are mixed in a single mixer to form the sealing wall building material for the sealing wall element.

* * * * *